No. 633,749. Patented Sept. 26, 1899.
J. C. ANDERSON.
BICYCLE.
(Application filed May 16, 1898. Renewed Mar. 9, 1899.)
(No Model.) 2 Sheets—Sheet 1.
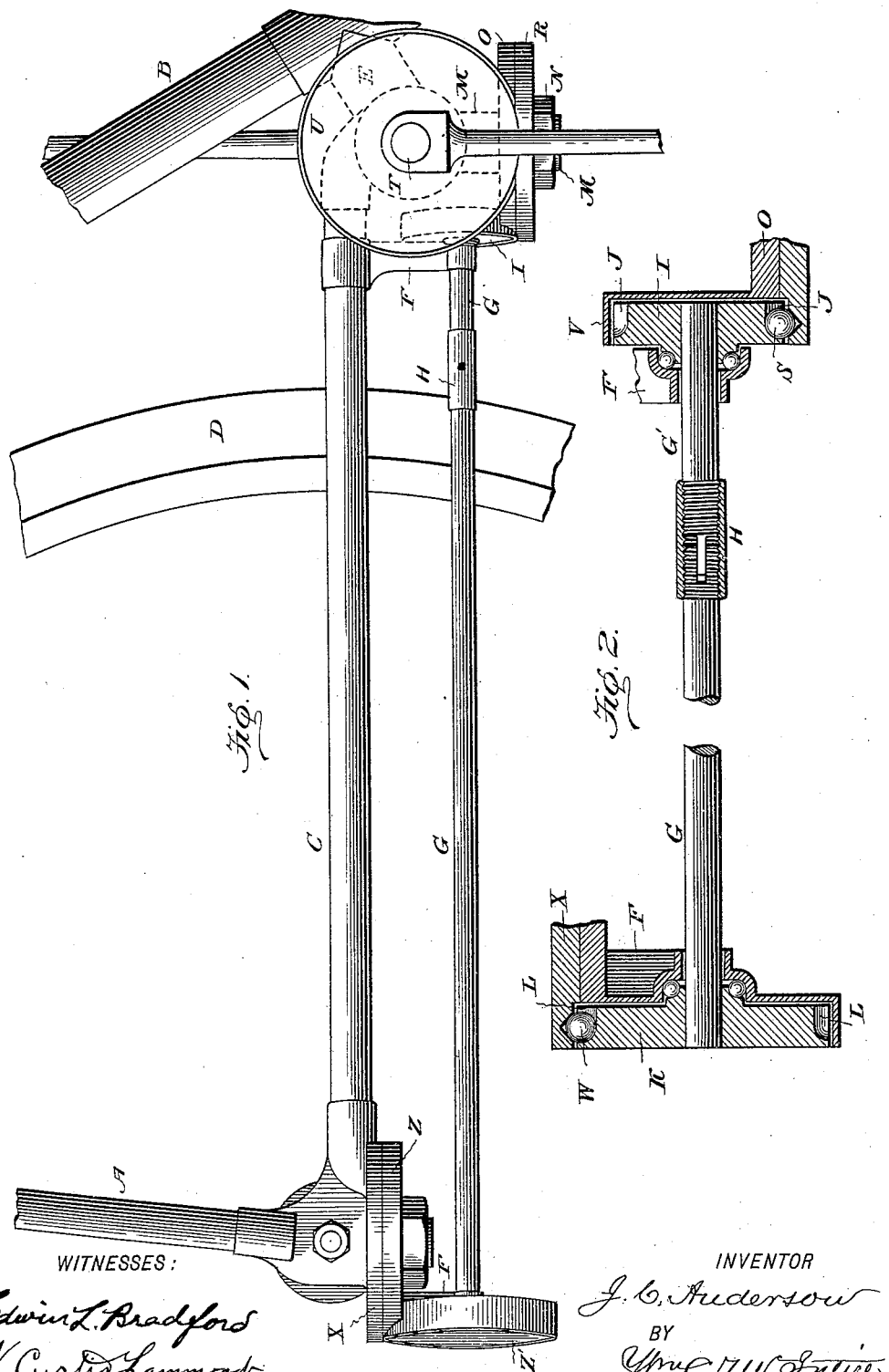
WITNESSES:
Edwin L. Bradford
N. Curtis Lammond
INVENTOR
J. C. Anderson
BY
ATTORNEY.

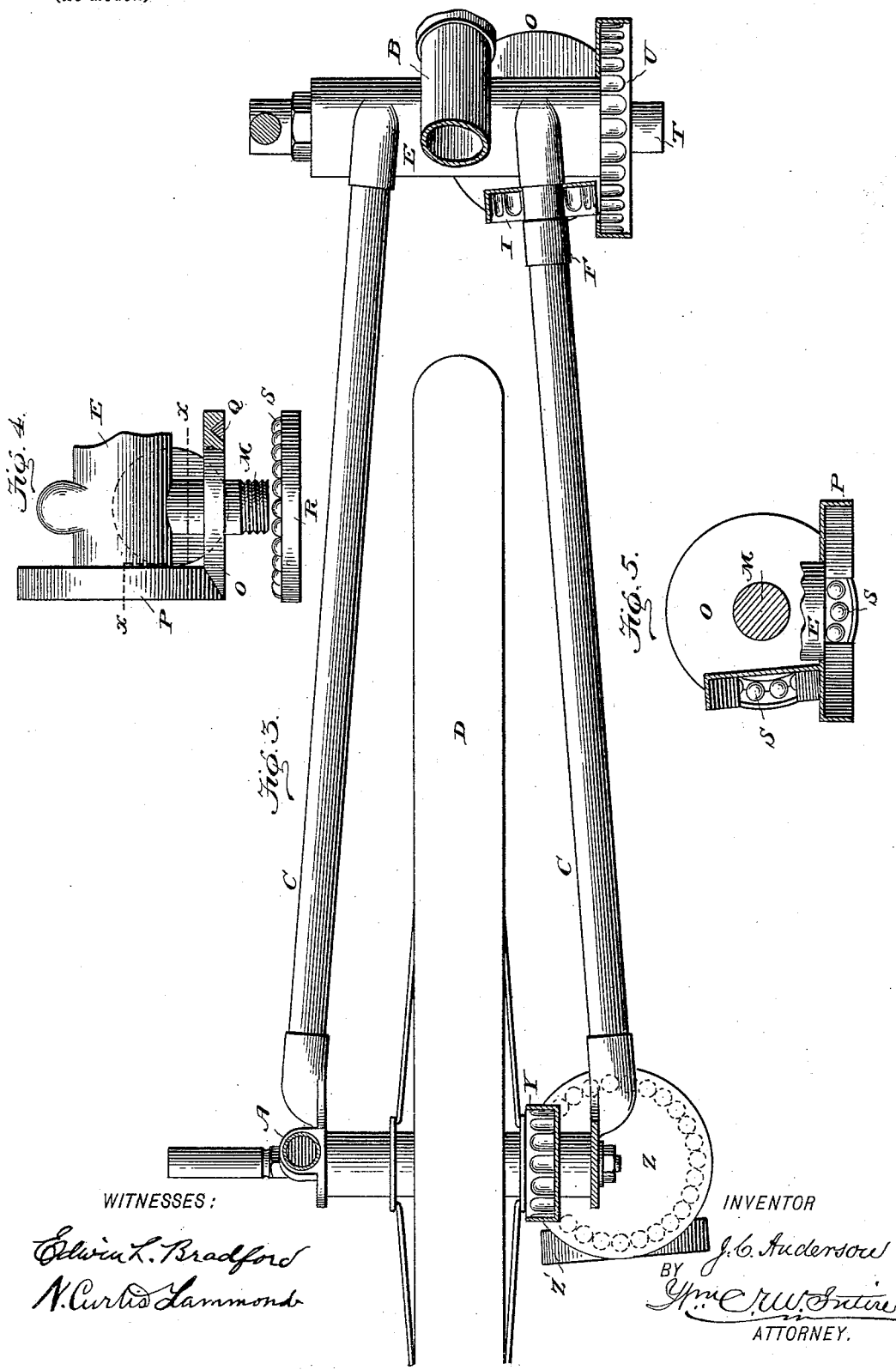

UNITED STATES PATENT OFFICE.

JAMES C. ANDERSON, OF HIGHLAND PARK, ILLINOIS.

BICYCLE.

SPECIFICATION forming part of Letters Patent No. 633,749, dated September 26, 1899.

Original application filed February 7, 1898, Serial No. 669,396. Divided and this application filed May 16, 1898. Renewed March 9, 1899. Serial No. 708,461. (No model.)

*To all whom it may concern:*

Be it known that I, JAMES C. ANDERSON, a citizen of the United States, residing at Highland Park, in the county of Lake and State of Illinois, have invented certain new and useful Improvements in Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in bicycles as originally described in and constituting a part of another application, Serial No. 669,396, filed by me February 7, 1898, and of which this is a divisional application.

My present invention has for its object to provide an entirely novel means for imparting power and motion from the crank-shaft to the driving-wheel and to overcome all of the objections existing to the ordinary bevel or spur gearing as at present used in lieu of chain-gearing.

The most serious defect in spur or bevel gearing, aside from the objectionable amount of friction, lies in the fact that if the bearings of gear mechanism become distorted or strained from their original planes to even a limited extent the increase in friction becomes so great as to render their operation difficult, while any distortion or strain of the bearings to a greater extent renders such gearing absolutely inoperative. With a view of overcoming these objections and providing a chainless mechanism for transmitting power and motion from one plane to another at an angle thereto and especially adapted for use in bicycles my invention consists in arranging a power-transmitting shaft intermediate or between the driving and driven mechanism and transmitting power and motion through the shaft by means of balls arranged within a circular race in a stationary disk or head and two or more ball-cup disks so arranged that their peripheries will intersect the traveling plane of the balls in the ball-disk, all as will be hereinafter more fully set forth.

In order that those skilled in the art to which my invention appertains may know how to make and use the same, I will proceed to describe the construction and operation of the same as applied to a bicycle, referring by letters to the accompanying drawings, in which I have shown only so much of a bicycle as is necessary for a full understanding, and in which—

Figure 1 is a side view of the driving mechanism applied to a bicycle. Fig. 2 is a longitudinal section of the driving-shaft and showing its connection with the crank mechanism and rear-wheel driving mechanism. Fig. 3 is a plan view with disk-housings partly in section. Fig. 4 is a detail front view of the stationary ball-carrying disk and housing employed in connection with the crank-hanger and with the ball-carrying disk dropped slightly down from its normal position to expose the balls mounted therein, and Fig. 5 is a horizontal section taken on the line $x\ x$ of Fig. 4.

Similar letters of reference denote like parts in the several figures of the drawings.

A represents the rear fork of the bicycle-frame; B, the front tube; C C, the lower fork or brace; D, the rear or driving wheel, and E the crank-hanger.

F F are two hangers depending from one member C of the lower fork, and in the lower extremities of these hangers is journaled the power-transmitting shaft, made in two sections G G', (see Fig. 2,) the adjacent ends of which are mortised and tenoned or otherwise formed to secure proper and fixed axial relation between the two sections when they are connected by a sleeve H, having right and left hand threads, corresponding with similar threads on the ends of the sections G G'. To the forward end of the section G' of the shaft is secured in any suitable manner a disk I, having a series of cells or ball-cups J in its periphery, (see Figs. 2 and 3,) open radially and forwardly. To the rear end of section G of the shaft is secured a similar disk K with similar ball-cups L. Each of the ball-cup disks I and K is formed with a ball-cone hub, between which and a ball-race in the hangers F F are confined antifriction-balls, as shown, and the proper adjustment of the several parts is secured through the medium of the sleeve H, connecting the ends of the power-transmitting shaft.

Secured to the under side of the crank-hanger E and depending therefrom is a rigid stud or bolt M, threaded to receive a nut N. A right-angled housing O P is secured to the crank-hanger E and bolt M, and the horizontal portion O of this hanger is formed with a circular ball-race Q.

R is a ball-disk having a ball-race similar to the ball-race Q, and balls S are arranged in the ball-races between the housing-disk O and ball-disk R and held in position by the nut N in an obvious manner.

To the crank-shaft T is rigidly secured a ball-cup disk U, similar in construction to the ball-cup disks I K on the power-transmitting shaft. This disk U is when the crank-shaft is in position housed within the vertical portion P of the housing, hereinbefore referred to. The periphery of the ball-cup disk U on the crank-shaft intersects the horizontal plane of the train of balls located in the ball-disk R. The radial walls between the ball-cups successively enter the reversely-curved recesses or spaces between the balls S, and as a consequence drive the train of balls continuously around in their circular race.

The ball-cup disk I on the forward end of the power-transmitting shaft is inclosed (when in position) within a housing V, which connects with the housing O, and the periphery of the ball-cup disk I at its lowest point passes through an opening in the housing O, and the radial walls of the cups in the disk I enter the spaces between the balls S, as previously described with reference to the ball-cup walls of the ball-cup disk U. As the balls are driven around in their circular race by the action of the ball-cup disk U on the crank-shaft they come in contact with the cup-walls of the disk I and in an obvious manner cause said disk and the power-transmitting shaft to rotate. The ball-cup disk K at the rear end of the power-transmitting shaft intersects the path of a train of balls W, located in a circular race in a horizontal disk X, secured to the lower end of the frame-tube A and causes said balls to travel around their circular race, and in such travel said balls contact with the walls between the cups or cells of a disk Y, rigidly secured to the hub of the rear driving-wheel D, and consequently the last-named disk and the wheel D are rotated in a direction to propel the bicycle. The several disks at the rear end of the bicycle are all suitably housed in a casing Z Z' in substantially the same manner as already described with reference to the disks at the forward end of the bicycle.

It will be understood that I do not wish to be limited to the exact relation shown of the several disks, power-shaft, &c. For instance, instead of arranging the power-transmitting shaft in hangers below the fork C, I may arrange it in suitable posts above said fork, and the intersecting disks would be accordingly changed as to position. Many other changes may be made in the details of construction and arrangement without departing from the spirit of my invention, which consists of the broad idea of utilizing the enforced circular travel of a train of balls as the medium of communicating power and motion from one point to another at an angle thereto.

I am aware that it has been proposed to drive balls through a path similar to that traveled by a sprocket-chain in safety-bicycles and as a substitute for such chain; but such construction is impractical owing to the necessary lateral thrust of the balls in changing the direction of their movement and also because of the inability to secure perfect smoothness and hardness of the ball-race. I am also aware that it has been proposed to drive a train of balls spirally around the crank-axle and rear-wheel axle of a bicycle and through a tubular race each side of the machine, connecting at both ends with the spiral races, and I do not wish to have my invention confounded with any such constructions, but, on the contrary, desire to call especial attention to the fact that in my improved construction I take advantage of the well-known principle of the axial rotation and circular path of travel of a train of balls as antifriction devices and to utilize the same as a means for transmitting power and motion in planes at an angle to each other, and wherein the ordinary variation in the relation of the parts of a machine will not affect the successful operation and usefulness of the driving mechanism.

What I claim as new, and desire to secure by Letters Patent, is—

1. As a means for transmitting power and motion from an initial point or locality to another at an angle thereto, the combination and arrangement of a ball-disk having a circular race provided with a train of balls, two or more ball-cup disks whose peripheries intersect the plane of the balls in the ball-disk, suitable transmitting-shaft connected with one or more of the ball-cup disks, and means for driving the balls around their circular race, substantially as described.

2. In a bicycle, in combination with the crank-hanger provided with a ball-disk Q, R, formed with a circular ball-race and furnished with a train of balls S, the crank-shaft T provided with a fixed ball-cup disk U, and a power-transmitting shaft G, G' provided at its forward end with a ball-cup disk I, the peripheries of the ball-cup disks U and I intersecting the horizontal plane of the train of balls S, whereby the said balls are driven around their circular race and communicate power and motion to the shaft G, G', substantially as and for the purpose set forth.

In testimony whereof I affix my signature in presence of two witnesses.

JAMES C. ANDERSON.

Witnesses:
N. CURTIS LAMMOND,
WM. M. HANNAY.